United States Patent
Oroskar et al.

(10) Patent No.: US 9,629,187 B1
(45) Date of Patent: Apr. 18, 2017

(54) DYNAMIC SELECTION OF CALL SETUP PROCEDURE BASED ON CHANNEL QUALITY

(71) Applicant: Sprint Spectrum L.P., Overland Park, KS (US)

(72) Inventors: Siddharth S. Oroskar, Overland Park, KS (US); Maulik K. Shah, Overland Park, KS (US); Jasinder P. Singh, Olathe, KS (US); John W. Prock, Raymore, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 555 days.

(21) Appl. No.: 14/026,952

(22) Filed: Sep. 13, 2013

(51) Int. Cl.
*H04W 76/02* (2009.01)
*H04W 72/04* (2009.01)
*H04W 16/10* (2009.01)

(52) U.S. Cl.
CPC ........... *H04W 76/02* (2013.01); *H04W 72/04* (2013.01); *H04W 16/10* (2013.01)

(58) Field of Classification Search
CPC ...... H04W 76/02; H04W 72/04; H04W 16/10
See application file for complete search history.

(56) References Cited

U.S. PATENT DOCUMENTS

| | | | |
|---|---|---|---|
| 2005/0025093 A1* | 2/2005 | Yun | H04W 76/02 370/328 |
| 2011/0176485 A1* | 7/2011 | Pudney | H04W 36/0022 370/328 |
| 2012/0028661 A1* | 2/2012 | Fang | H04W 36/0022 455/466 |
| 2013/0003599 A1* | 1/2013 | Zakrzewski | H04W 48/18 370/253 |
| 2013/0072123 A1* | 3/2013 | Garavaglia | H04L 1/0026 455/63.1 |
| 2013/0258888 A1* | 10/2013 | Jeong | H04W 36/0022 370/252 |

* cited by examiner

*Primary Examiner* — Lester Kincaid
*Assistant Examiner* — William Wang (57) ABSTRACT

A method and system for dynamically selecting call setup procedure based on channel quality. While a wireless communication device (WCD) is being served by a first radio access network (RAN), a network node receives an indication of a communication quality of the at least one channel used by the first RAN to serve the given WCD. Then, the network node selects a call setup procedure for establishing a call to be served by a second RAN based on the received indication of the communication quality of the at least one channel, where the selected call setup procedure comprises the given WCD transitioning to be served with the call by the second RAN. Next, the network node signals to invoke setup of the call using the selected call setup procedure.

20 Claims, 6 Drawing Sheets

DYNAMIC SELECTION OF CALL SETUP PROCEDURE BASED ON CHANNEL QUALITY

BACKGROUND

Unless otherwise indicated herein, the materials described in this section are not prior art to the claims and are not admitted to be prior art by inclusion in this section.

A cellular wireless network may include a number of base stations that radiate to define wireless coverage areas, such as cells and cell sectors, in which wireless communication devices (WCDs) such as cell phones, tablet computers, tracking devices, embedded wireless modules, and other wirelessly equipped communication devices, can operate. In turn, each base station may be coupled with network infrastructure that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

In general, a cellular wireless network may operate in accordance with a particular air interface protocol or "radio access technology," with communications from the base stations to WCDs defining a downlink or forward link and communications from the WCDs to the base stations defining an uplink or reverse link. Examples of existing air interface protocols include, without limitation, Code Division Multiple Access (CDMA) (e.g., 1×RTT and 1×EV-DO), Long Term Evolution (LTE), WiMAX, iDEN, TDMA, AMPS, Global System for Mobile Communications (GSM), GPRS, UMTS, EDGE, MMDS, WI-FI, and BLUETOOTH, among other examples. Each protocol may define its own procedures for registration of WCDs, initiation of communications, handoff between coverage areas, and other functions related to air interface communication.

In accordance with the air interface protocol, each coverage area may operate on one or more carrier frequencies (or "carriers") and may define a number of air interface channels for carrying information between the base station and WCDs. These channels may be defined in various ways, such as through frequency division multiplexing, time division multiplexing, and/or code-division multiplexing for instance.

By way of example, each coverage area may define a pilot channel, reference channel or other resource on which the base station may broadcast a pilot signal, reference signal, or the like that WCDs may detect as an indication of coverage and may measure to evaluate coverage strength. As another example, each coverage area may define an uplink control channel or other resource on which WCDs may transmit control messages such as registration requests and access requests to the base station. And each coverage area may define a downlink control channel or other resource on which the base station may transmit control messages such as system information messages and page messages to WCDs. Each coverage area may then define one or more traffic channels or other resource for carrying communication traffic such as voice data and other data between the base station and WCDs.

In some arrangements, when a WCD first powers on or enters into coverage of the network, the WCD may scan for and identify a strongest pilot or reference signal and may register with the network by transmitting a registration request or attach request to a base station providing that signal. This registration process may serve to notify the network of the WCD's presence in a particular coverage area and to facilitate network authentication of the WCD. Once registered, the WCD may then operate in an idle mode in which the WCD monitors a downlink control channel to receive overhead information and to check for any page messages. In the idle mode, the WCD may have no assigned traffic channel resources on which to engage in bearer communication.

When the network has a communication (such as a voice call or other traffic) to provide to a WCD that is registered with the network but is operating in the idle mode, the network may page the WCD in an effort to then facilitate assigning traffic channel resources to the WCD. In particular, the network may transmit on the downlink a page message addressed to the WCD. Assuming the WCD receives this page message, the WCD may then transmit to the network a page response message on the uplink. And upon receipt of the page response message, the network may then assign traffic channel resources to the WCD, for use to carry the communication, thus transitioning the WCD to a connected or active mode in which the WCD can engage in the communication.

Likewise, when an idle WCD seeks to initiate (or originate) a communication (such as to place a voice call or engage in other bearer communication), the WCD may transmit on the uplink to the base station an origination or connection request, and the network may then assign traffic channel resources to the WCD for use to carry the communication, similarly transitioning the WCD to a connected or active mode in which the WCD can engage in the communication.

OVERVIEW

In communication systems that provide service under more than one air interface protocol, service providers may implement functionality that allows WCDs to operate on one air interface protocol and to dynamically switch over to operate on another air interface protocol to engage in certain communications. By way of example, in a system that supports both LTE service for mobile broadband and another protocol such as CDMA or GSM for traditional voice calls, service providers may implement "circuit switched fallback" (CSFB) functionality, which allows WCDs to operate by default on LTE and to switch over to operate on CDMA or GSM to engage in voice calls. Further, service providers may implement "enhanced circuit switched fallback" (eCSFB) functionality to make use of certain additional functions that support transition of a WCD from operating on one network to another. The example method described herein, or aspects thereof, may be carried out using CSFB functionality and/or eCSFB functionality, as will be readily understood by one of skill in the art. It should be understood, therefore, that the terms "CSFB" and "eCSFB" are used herein interchangeably.

Under eCSFB, a hybrid CDMA/LTE WCD may be arranged by default to scan for and register with an LTE network and to operate with its CDMA radio powered off, and then engage in control signaling with the CDMA network via the LTE network, i.e., over the LTE air interface. To facilitate this, when the WCD registers with the LTE network, LTE network infrastructure such as a mobility management entity (MME) may signal through a network node such as an interworking server (IWS) with the CDMA network to register the WCD with the CDMA network.

In turn, when the CDMA network has a voice call to connect to the WCD, the CDMA network may signal through the IWS to the LTE network to cause the LTE network to send an eCSFB page message to the WCD over the LTE air interface. And upon receipt of that eCSFB page message, the WCD may responsively turn on its CDMA radio and tune to the CDMA network according to a predetermined call setup procedure to then engage in the call over the CDMA air interface.

The particular call setup procedure used to set up the eCSFB call over the CDMA air interface may take various forms. In one implementation the call setup procedure may involve the LTE network simply releasing the WCD from being served under the LTE air interface protocol, and redirecting the WCD to obtain service under the CDMA air interface protocol. In such an implementation, the WCD may obtain connectivity information for engaging in the call (such as carrier and traffic channel information, among other examples) from the CDMA network itself.

In another implementation, the call setup procedure may involve the LTE network providing the WCD with some information for use in communicating with the CDMA network, before the WCD tunes to the CDMA network and begins to engage in such communications with the CDMA network. In this implementation, some information for use in communicating with the CDMA network may be provided to the WCD by the CDMA network itself. For instance, the LTE network may provide the WCD with a particular carrier for use under the CDMA air interface (which the LTE network may have received from the CDMA network, perhaps by way of an IWS), and the CDMA network may provide the WCD with a particular traffic channel for use under the CDMA air interface.

In yet another implementation, the call setup procedure may involve the LTE network providing the WCD with still more information for use in communicating with the CDMA network, before the WCD tunes to the CDMA network and begins to engage in such communications with the CDMA network. For instance, the LTE network may provide the WCD with both a particular carrier and a particular traffic channel for use under the CDMA air interface (which the LTE network may have received from the CDMA network, perhaps by way of an IWS).

Other examples of call setup procedures, and/or aspects thereof, may exist.

When the communication quality of a communication channel used by the LTE network to communicate with the WCD is sufficiently good, such that control information sent from the first RAN to the WCD is likely to be received, it may be desirable to provide to the WCD at least some information that the WCD will use to carry out communications with the CDMA network (e.g., carrier and/or traffic channel information) via the LTE network. In this way, the system may help improve the chances that the call is successfully set up, and that it is done so in an efficient manner. However, when the communication quality of the communication channel used by the LTE network to communicate with the WCD is relatively poor, it may be the case that the LTE network is not capable of efficiently communicating to the WCD information for use in communicating with the CDMA network. In such a case, if the LTE network nonetheless attempts to provide such information to the WCD, the WCD may not receive the information, which may ultimately result in a failed call setup procedure.

Disclosed herein is a method and corresponding apparatus to help avoid a failed eCSFB call setup procedure and also to help ensure that the system implements an efficient eCSFB call setup procedure.

According to the method, while a given WCD is being served by a first RAN (e.g., an LTE RAN) using at least one channel, a network node (e.g., as an IWS) receives an indication of a communication quality of the at least one channel used by the first RAN to serve the given WCD. Then, the network node selects a call setup procedure for establishing a call (e.g., an eCSFB call) to be served by the second RAN (e.g., a CDMA RAN) based on the received indication of the communication quality of the at least one channel. The selected call setup procedure will generally involve the given WCD transitioning to be served with the call by the second RAN. Ultimately, then, the network node may signal to invoke setup of the call using the selected call setup procedure.

The network node may select the call setup procedure from among multiple alternative call setup procedures (such as any of those procedures discussed above) depending on how good the indication of the communication quality of the at least one channel used by the first RAN to serve the given WCD is. For instance, if the communication quality does not exceed a first communication-quality threshold, the network node may select a call setup procedure that involves simply releasing the given WCD from the first RAN, and redirecting the given WCD to the second RAN. Alternatively, if the communication quality exceeds the first communication-quality threshold, the network node may select a call setup procedure that involves the first RAN providing the given WCD with a particular carrier for use with the second RAN, while the second RAN may then provide the given WCD with a particular traffic channel. And, further, if the communication quality exceeds a second communication-quality threshold that is greater than the first communication-quality threshold, the network node may select a call setup procedure that involves the first RAN providing the given WCD with both a particular carrier and a particular traffic channel for use with the second RAN.

As discussed further below, other techniques for selecting call setup procedures, as well as other possible call setup procedures, may be implemented with the present method also.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

As noted above, FIG. 1 is a simplified block diagram of a network arrangement in which an exemplary embodiment of the present method and apparatus can be implemented. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

Figure 1:
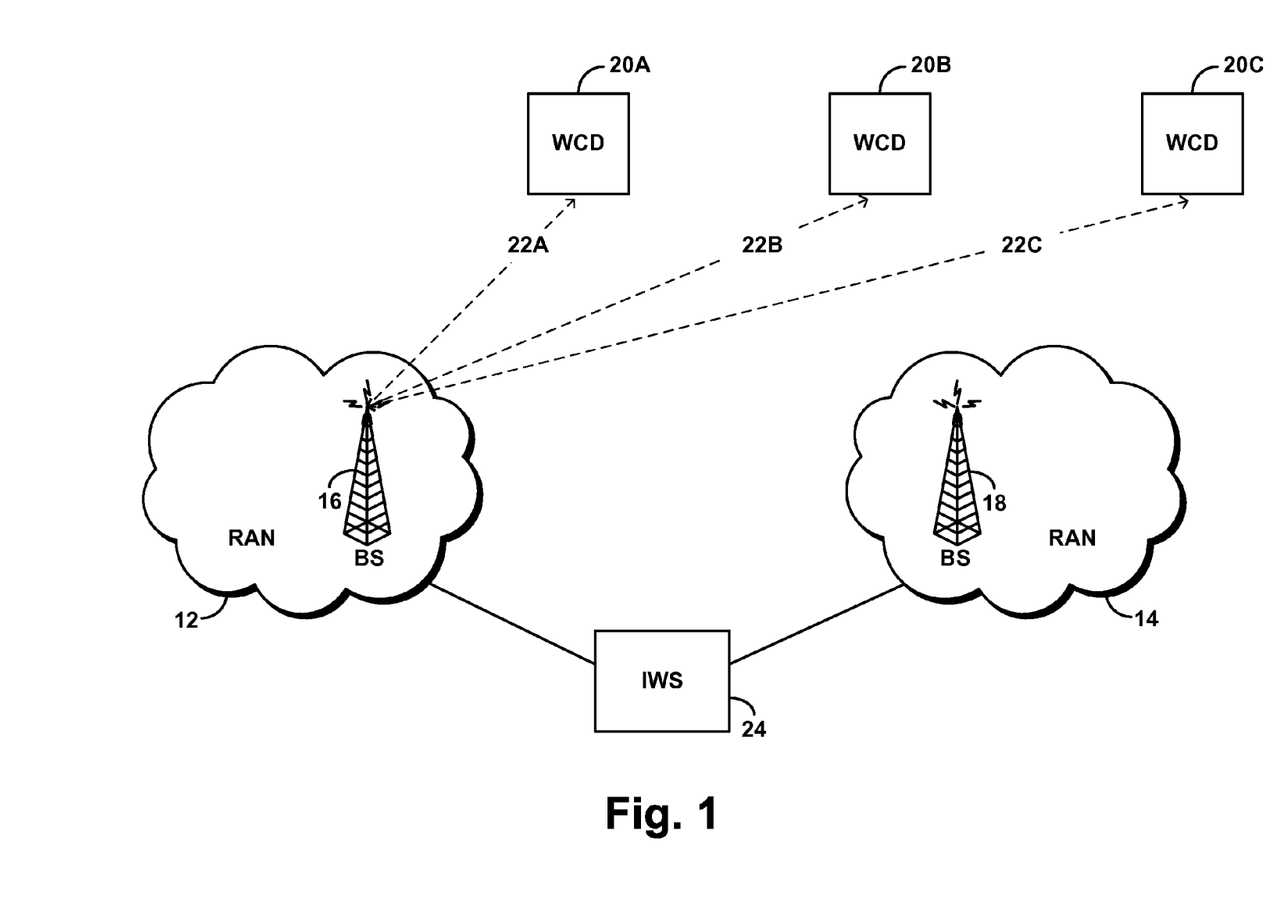
FIG. 1 is a simplified block diagram of a network arrangement in which an example embodiment of the present method and apparatus can be implemented.

The arrangement of FIG. 1 includes by way of example two representative radio access networks (RANs) 12, 14, each of which may function to provide wireless communication devices (WCD(s)), such as any of WCD 20A-C, with air interface coverage and connectivity with one or more transport networks such as the PSTN and the Internet. As shown, RAN 12 includes a representative base station (BS) 16 that radiates to provide a respective coverage area defining an air interface through which to exchange control and bearer data with WCD(s), and RAN 14 includes a representative BS 18 that radiates to provide a respective coverage area defining an air interface through which to exchange control and bearer data with WCD(s). Although only one representative BS and coverage area is shown per RAN, the RANs could just as well include more than one BS that cooperatively define a coverage area or multiple coverage areas.

As further shown, RAN 12 and RAN 14 are communicatively coupled together through a representative intermediary such as an IWS 24 that facilitates exchange of signaling and various information between the RANs. More particularly, RAN 12 is communicatively coupled to IWS 24, and RAN 14 is also communicatively coupled to IWS 24. In practice, for instance, the base station of each RAN may be in communication with back-end network infrastructure, which may be in turn be in communication with the IWS. Thus, registration and call setup signaling could be exchanged between the RANs, to support functionality such as eCSFB for instance.

RAN 12 and RAN 14 may be owned and operated by a common wireless service provider, and the service provider may configure the RANs to interwork with each other (or may arrange for the IWS to associate the RANs with each other) so as to facilitate eCSFB for instance. Alternatively, the RANs may be owned and/or operated by separate wireless service providers, and those service providers may have an agreement with each other to allow for interworking between the networks, again to facilitate eCSFB or the like.

In practice, RAN 12 may be configured to respond to a registration request received from a given WCD in its coverage area by not only registering the given WCD as being in that coverage area of RAN 12 but also signaling to the IWS to trigger registration of the UE with RAN 14 as well. Further, a service provider may configure RAN 14 to receive and record such a registration and to page the given WCD for a call that will be served by RAN 14, to transmit a page message to the IWS so as to trigger paging of the given WCD by RAN 12 and ultimately transition of the WCD to take the call over the air interface provided by RAN 14. Further, the RANs may be configured in additional ways to support eCSFB or the like.

With the arrangement shown in FIG. 1, each of WCD 20A-C is positioned within the respective coverage areas of both RAN 12 and RAN 14, and so this interworking process may work well for each of WCD 20A-C. However, as shown, each of WCD 20A-C is of a respective different distance from serving BS 16 of RAN 12. As such, the respective communication quality of a communication channel by which each of WCD 20A-C receives and sends communications from and to RAN 12 may vary.

More particularly, WCD 20A is shown as being a distance 22A from BS 16, WCD 20B is shown as being a distance 22B from BS 16, and WCD 20C is shown as being a distance 22C from BS 16. According to the example shown, distance 22C is greater than distance 22B, and distance 22B is greater than distance 22A. In turn, the communication quality of a communication channel by which WCD 20C communicates with BS 16 may be higher than the communication quality of a communication channel by which WCD 20B communicates with BS 16. And the communication quality of the communication channel by which WCD 20B communicates with BS 16 may be higher than the communication quality of the communication channel by which WCD 20A communicates with BS 16.

It should be understood that the communication quality of a communication channel that BS 16 uses to communicate with a given WCD may vary for other reasons than distance. For instance, the communication quality of the communication channel may generally depend on an amount of wireless interference present on the channel. As a general matter, there are innumerable potential sources of wireless interference, and the wireless interference caused by such sources may vary in time. For example, wireless interference may be caused by transmissions from other WCDs and/or other base stations.

Another example is long-distance wireless interference, whereby a WCD receives interfering signals emitted by transmitters that are great distances away from the WCD. Such long-distance interference may be caused, for instance, by "skip," whereby ionized gases in the ionosphere reflect transmitted signals back to earth at great distance, or may be caused by "ducting," whereby air of different temperatures and humidity forms layers in the lower atmosphere, and causes signals to be refracted and reflected at much greater distances than normal.

Yet another example still of wireless interference is general RF interference that may be caused by radio equipment other than that associated with the communication network, such as electric motors and faulty spark plug wires, just as examples. And natural phenomena such as lightning and solar activity may also cause interference with signals received by the WCD.

Other examples of sources of wireless interference exist as well.

In practice, WCD 20A may scan for and detect coverage of RAN 12 and may responsively register with RAN 12 by transmitting in its respective coverage area to BS 16 a registration request. In response, RAN 12 may then record the fact that WCD 20A is present within the coverage area served by BS 16, so as to facilitate paging WCD 20A for calls or the like. Further, given the association between RAN 12 and RAN 14, RAN 12 may also responsively signal to IWS 24 to trigger registration of WCD 20A with RAN 14. UE 20A may then idle in the coverage area of RAN 12.

When RAN 14 has a call to connect to WCD 20A, RAN 14 may then send a page message (or a page-message trigger) to IWS 24 to trigger paging of WCD 20A. RAN 12 may then responsively page WCD 20A by causing BS 16 to transmit a page message to WCD 20A. In line with one of the example eCSFB procedures briefly described above, this may then lead to RAN 14 assigning to WCD 20A a carrier and air interface traffic channel in the coverage area served by BS 18, and WCD 20A transitioning to be served in the coverage area of BS 18 and to engage in the call over the assigned carrier and air interface traffic channel. In an implementation, the assigned carrier and/or air interface traffic channel may be communicated to WCD 20A via BS 16 of RAN 12, before WCD 20A tunes to RAN 14.

However, with the arrangement shown, because WCD 20C is positioned relatively further from BS 16 than is WCD 20A, the communication quality of the communication channel between WCD 20C and BS 16 may therefore be relatively lower than the communication quality of the communication channel between WCD 20A and BS 16. Consequently, contrary to the description provided above with respect to WCD 20A, it may be the case that it is not efficient, or that it is not possible, to communicate via BS 16 to WCD 20C some control signaling, such as control signals that provide the assigned carrier and/or traffic channel for use with RAN 14.

For example, as with WCD 20A, WCD 20C may initially scan for and detect coverage of RAN 12 and may responsively register with RAN 12 by transmitting in the coverage area of BS 16 a registration request. In one example, such registration may occur when WCD 20C is at a distance relatively closer to BS 16 than distance 22C. In response, RAN 12 may then record the fact that WCD 20C is present within the coverage area served by BS 16, so as to facilitate paging WCD 20C for calls or the like. Further, given the association between RAN 12 and RAN 14, RAN 12 may also responsively signal to IWS 24 to trigger registration of WCD 20C with RAN 14. WCD 20C may then idle in the coverage area of RAN 12.

In turn, when RAN 14 has a call to connect to WCD 20C, RAN 14 may then send a page message (or a page-message trigger) to IWS 24 to trigger paging of WCD 20C, and RAN 12 then responsively page WCD 26 by having base station 16 transmit a page message to WCD 20C. Further, in an example eCSFB implementation for instance, the system may seek to communicate the assigned carrier and/or air interface traffic channel to WCD 20C via BS 16 of RAN 12. However, because of a relatively poor communication quality of the communication channel between WCD 20C and BS 16, it may not be possible, or it may be otherwise inefficient, to do so. Consequently, the process may fail or may be otherwise undesirably inefficient.

Figure 2:
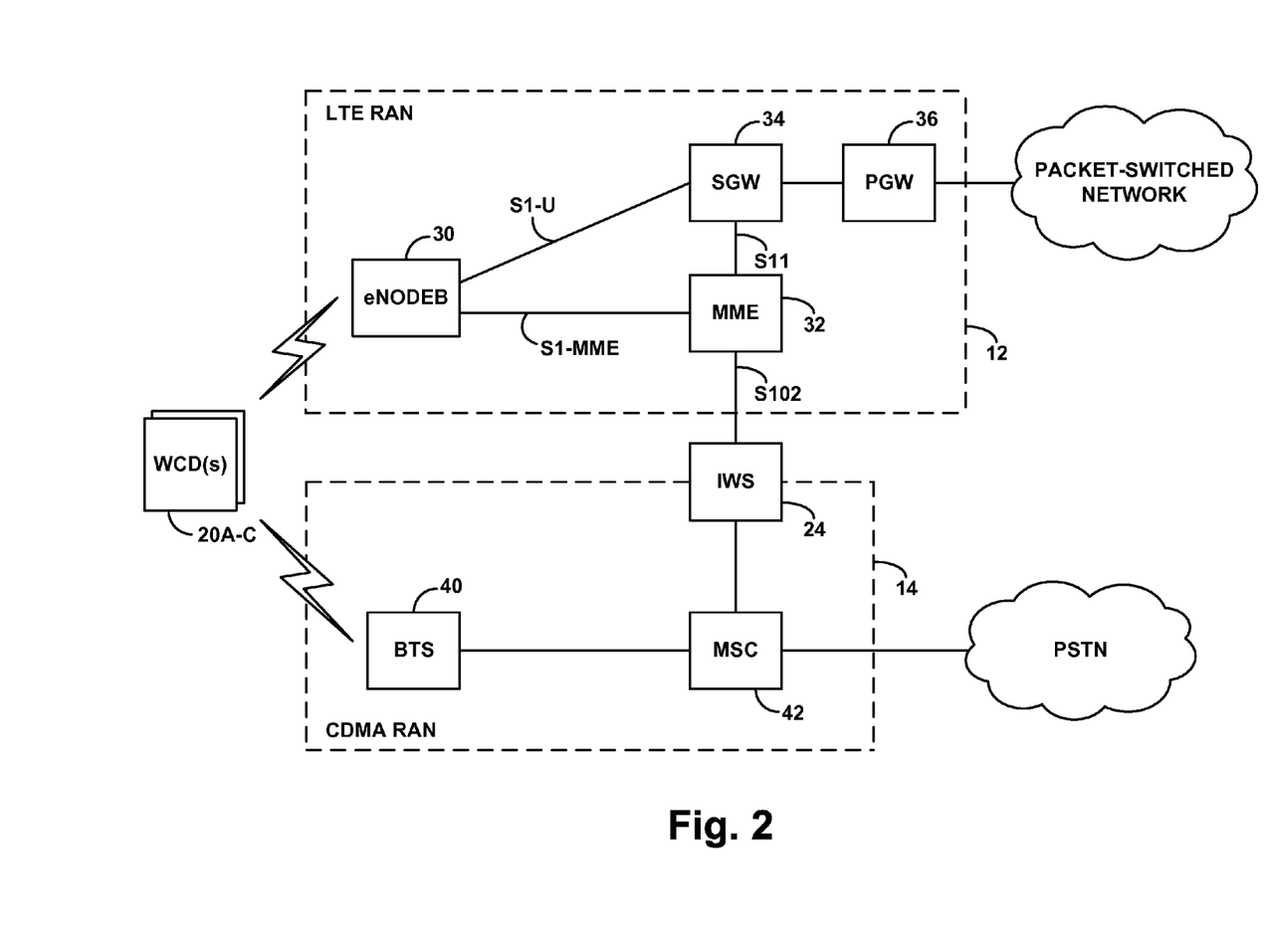
FIG. 2 is a simplified block diagram of a more specific network arrangement in which the example embodiment can be implemented.

FIG. 2 is next a more specific block diagram depicting an example network arrangement like that shown in FIG. 1. In the arrangement of FIG. 2, RAN 12 is an 4G LTE network that primarily serves WCD(s) with wireless packet data communication service (including perhaps voice-over-packet and other packet-based real-time media service), and RAN 14 is a 3G CDMA network that primarily serves WCD(s) with circuit-switched voice call service (but may also provide packet-data communication service and other types of service). These networks could take other forms as well, using other protocols such as WiMAX, GSM, or others now known or later developed.

The 4G LTE network 12 in this arrangement is shown as including a representative LTE BS 30 known as an eNodeB, which includes an antenna structure and associated equipment for engaging in LTE communication over the air interface with WCD(s). The eNodeB 30 is then shown coupled with an MME 32 that serves as a signaling controller for the LTE network. Further, the eNodeB is also shown coupled with a serving gateway (SGW) 34, which may then be coupled with a packet-gateway (PGW) 36 that connects with a packet-switched network. And the MME 32 is shown coupled with the SGW 34.

The 3G network 14, on the other hand, is shown as including a representative CDMA BS 40 known as a base transceiver station (BTS), which includes an antenna structure and associated equipment for engaging in CDMA communication with WCD(s). The BTS is then shown in communication (possibly through a base station controller (BSC) (not shown)) with a mobile switching center (MSC) 42 that functions to manage paging over the CDMA air interface and to provide connectivity with the PSTN.

Further shown in FIG. 2 is then the IWS 24, which functions to facilitate interworking between the LTE network 12 and the CDMA network 14 as discussed above, so as to facilitate eCSFB functionality for instance.

In practice with this LTE/CDMA arrangement, the LTE eNodeB 30 may broadcast an overhead signal such as a System Information Block #8 (SIB8) that includes data that a recipient WCD may programmatically interpret to mean that the LTE coverage area in which the overhead signal is broadcast is one that supports eCSFB functionality. Assuming the recipient WCD is capable of engaging in eCSFB, the WCD may detect this broadcast signal and may responsively opt to register in the coverage area of the LTE network. Under LTE principles, the WCD may do so by transmitting an attach request to the eNodeB 30, including in the attach request data that indicates capabilities of the WCD such an indication that the UE supports eCSFB functionality.

Upon receipt of this attach request, the LTE network may register a presence of the WCD in the coverage area of eNodeB 30. For instance, eNodeB 30 may signal to MME 32 to trigger this registration. Further, in response to the attach request indicating that the WCD supports eCSFB functionality, MME 32 may also signal to IWS 24 to trigger registration of the UE with the CDMA network. In particular, upon receipt of the signal from MME 32, IWS 24 may signal to MSC 42, and the MSC (in cooperation, perhaps, with a home location register and/or other network infrastructure) may register the fact that the WCD is currently served by the LTE network.

Figure 3:
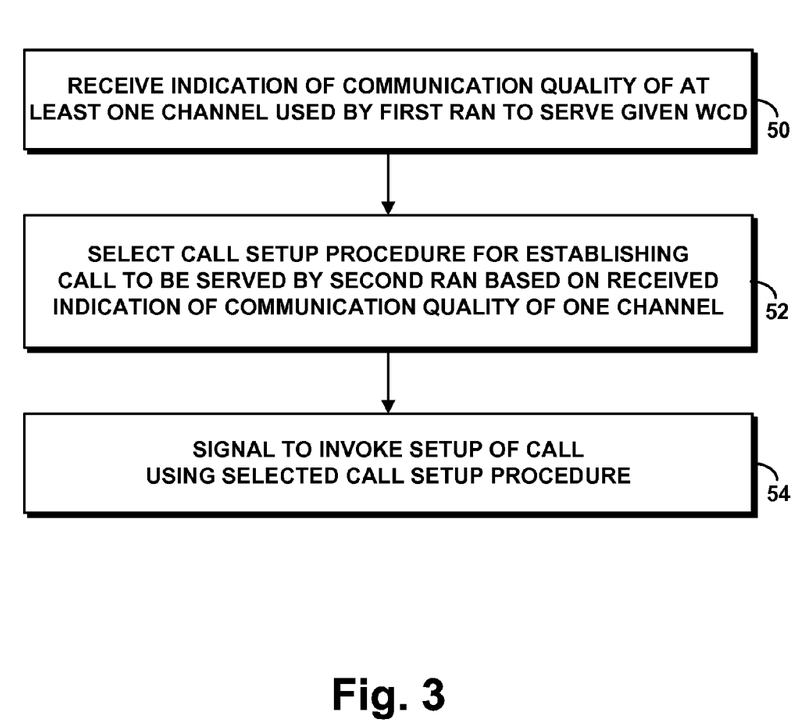
FIG. 3 is a flow chart depicting functions that can be carried out in accordance with an example method.

FIG. 3 is next a flow chart depicting functions that a representative network node, such as IWS 24, can carry out to facilitate a successful setup procedure for setting up an eCSFB call for a given WCD. The example method may also provide that the eCSFB call is setup in an efficient manner. In accordance with the method, a given WCD may be initially registered with RAN 12 (e.g., an LTE network), and the particular call setup procedure that is implemented may be selected for use depending upon the communication quality of a communication channel that exists between the given WCD and eNodeB 30.

As shown in FIG. 3, at block 50, the method involves, while the given WCD is being served by a first RAN using at least one channel, receiving at the network node an indication of a communication quality of the at least one channel used by the first RAN to serve the given WCD. At block 52, the method then involves selecting by the network node a call setup procedure for establishing a call to be served by a second RAN based on the received indication of the communication quality of the at least one channel, wherein the selected call setup procedure includes the given WCD transitioning to be served with the call by the second RAN. And, at block 54, the method involves signaling by the network node to invoke setup of the call using the selected call setup procedure. Various functions associated with these representative blocks of FIG. 3 are further explained below.

As noted, at block 50, while the given WCD is being served by the first RAN using at least one channel, the network node receives an indication of a communication quality of the at least one channel used by the first RAN to serve the given WCD. In an implementation, the network node may be an IWS, though this is not necessary. Further, the indication of the communication quality may be provided to the network node in any suitable manner and may be provided in any suitable form.

In an example implementation, the indication of the communication quality of the at least one channel may be received by the network node from the given WCD via the first RAN. For instance, the given WCD may send a message to a serving base station of the first RAN over the uplink of the air interface provided by the serving base station, where the message contains the indication of the communication quality of the at least one channel. In turn, various network elements of the first RAN may be configured to communicate the message to the network node.

The particular message sent by the WCD that contains the indication of the communication quality of the at least one channel may differ depending on whether the call is originated by the WCD or originated from a remote location (e.g., from another WCD served by a different or the same base station). For instance, first consider a situation where the call is originated from the given WCD. In such a situation, the given WCD may send an eCSFB origination message to originate the call, and that eCSFB origination message may include the indication of the communication quality of the at least one channel. Such an eCSFB origination message may be received by the serving base station of the first RAN and may then ultimately be communicated to the network node via the first RAN.

Second, consider another situation where the call is originated from a remote location. In such a situation, as noted above, the WCD may be paged via the serving base station of the first RAN. In response, the WCD may send an eCSFB page-response message, and that page-response message may include the indication of the communication quality of the at least one channel. Such an eCSFB page-response message may be received by the serving base stations of the first RAN and may then ultimately be communicated to the network node via the first RAN.

As noted above, the indication of the communication quality of the at least one channel may be provided in any suitable form. In one implementation, the received indication of the communication quality of the at least one channel may include a channel quality indicator (CQI). Such a CQI may be a value (or collection of values) that represent a measure of communication quality for the at least one channel. The CQI for the at least one channel may be computed by making use of any one or more of a variety of possible communication-quality metrics (or measurements). Examples of such communication-quality metrics may include signal-to-noise ratio (SNR), signal-to-interference plus noise ratio (SINR), and/or signal-to-noise plus distortion ratio (SNDR), among other examples. In one implementation, the WCD may provide any such communication-quality metric to the network node instead, or in addition to, the CQI for use in selecting a call setup procedure.

The particular communication channel(s) for which the WCD provides the indication of communication quality may vary. In one implementation, the particular channel(s) may include the control channel used by the WCD and the first RAN to communicate control messages. In another implementation, the particular channel(s) may instead, or additionally, include other channels including a traffic channel that is used by the WCD and the first RAN to communicate bearer messages.

Now, with reference to block 52, the network node selects a call setup procedure for establishing a call to be served by the second RAN based on the received indication of the communication quality of the at least one channel. As a general matter, the selected call setup procedure will involve the given WCD transitioning from being served by the first RAN to being served with the call by the second RAN.

As discussed further below, the example method may be implemented so that the network node selects a call setup procedure from among any number of possible call setup procedures. Further, the example method may involve selecting a first particular call setup procedure for use in a first circumstance (i.e., a first level of communication quality), selecting a second particular call setup procedure for use in a second circumstance (i.e., a second level of communication quality), and so on. And while a few particular examples of different such circumstances in which different respective call setup procedures may be selected are discussed below, it should be understood that these particular examples are provided for purposes of explanation only. Other examples may exist.

Figure 4:
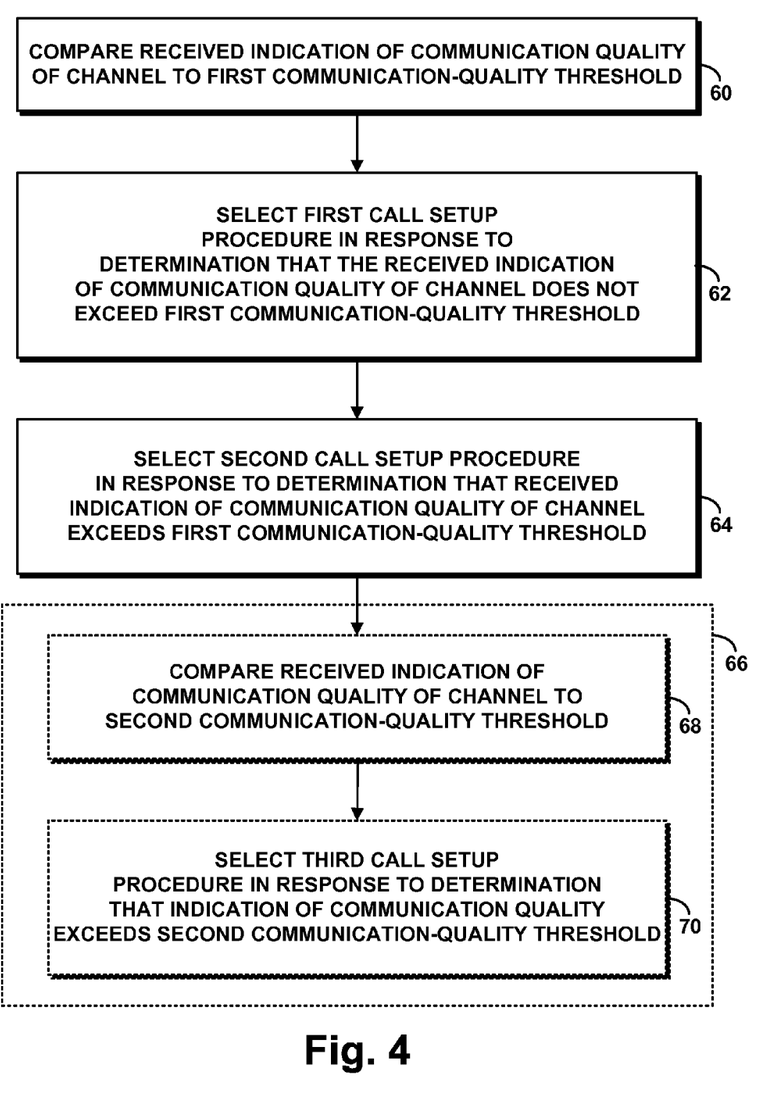
FIG. 4 is another flow chart depicting functions that can be carried out in accordance with an example method.

In accordance with the example method, as general matter the particular examples discussed below involve selecting a particular call setup procedure depending on the communication quality of a channel used by the first RAN to serve the given WCD. FIG. 4 is a flowchart depicting functions that a representative network node, such as IWS 24, can carry out to help select a call setup procedure based on the received indication of the communication quality of the at least one channel. Such functions may be carried out, for instance, in accordance with block 52 of the example method shown in FIG. 3.

As shown in FIG. 4, at block 60, such functions may include comparing the received indication of the communication quality of the at least one channel to a first communication-quality threshold. At block 62, the functions may then include selecting a first call setup procedure in response to a determination that the received indication of the communication quality of the at least one channel does not exceed the first communication-quality threshold. And, at block 64, the functions may include selecting a second call setup procedure in response to a determination that the received indication of the communication quality of the at least one channel exceeds the first communication-quality threshold.

As such, in an implementation, the network node selecting a call setup procedure may involve the network node comparing the received indication of the communication quality of the at least one channel to a particular communication-quality threshold. The network node may then select a given call setup procedure depending on whether the received indication of the communication quality exceeds or does not exceed that particular communication-quality threshold.

However, in another implementation, the network node may optionally select a call setup procedure from among more than two alternative call setup procedures. In such a case, the network node may compare the received indication of the communication quality to more than one particular communication-quality threshold to help determine which of three or more alternative call setup procedures should be selected.

For instance, returning to the example functions shown in FIG. 4, the network node may be additionally configured to carry out optional functions 66. These functions include, at block 68, comparing the received indication of the communication quality of the at least one channel to a second communication-quality threshold. In an implementation, the second communication-quality threshold may be greater than the first communication-quality threshold. Then, at block 70, the functions may include selecting a third call setup procedure in response to a determination that the indication of the communication quality exceeds the second communication-quality threshold.

For purposes of explanation, the selection of a particular call setup procedure is now further described with respect to three alternative call setup procedures. One particular call setup procedures from among such alternative call setup procedures may be selected based on a comparison of the received indication of the communication quality of the at least one channel to two separate communication-quality thresholds. However, again, it should be understood that this is for purposes of explanation only, and that more, or less, call setup procedures and/or more or less communication-quality thresholds may be used in accordance with the present method. Further, the particular call setup procedures described herein are described for purposes of explanation only. As noted above, other examples of suitable call setup procedures may exist as well.

Figure 5:
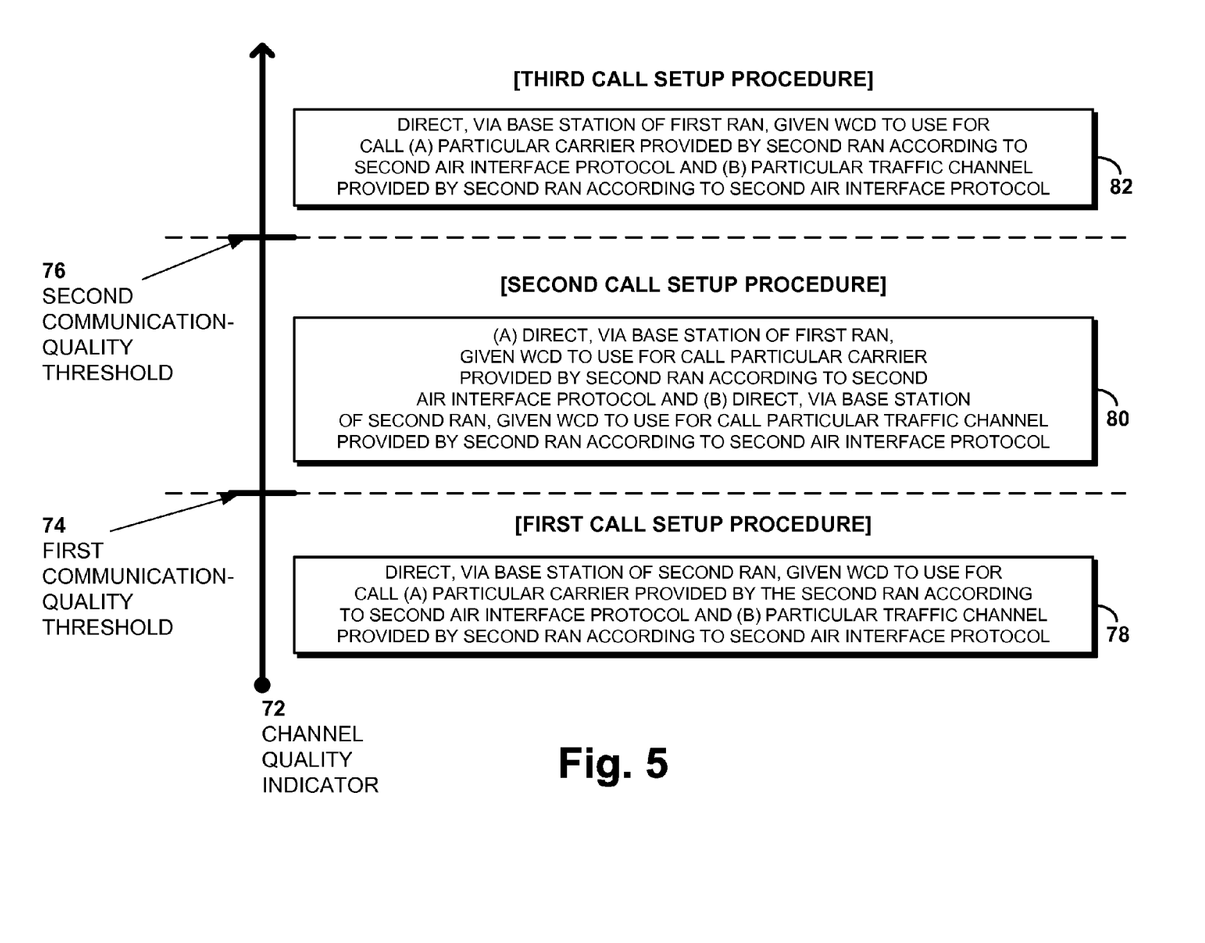
FIG. 5 is a simplified diagram of example communication-quality thresholds and corresponding example call setup procedures in accordance with an example method.

FIG. 5 is a simplified diagram of example communication-quality thresholds and example call setup procedures that may be used in accordance with execution of the functions described above with respect to FIG. 4. As shown, FIG. 5 includes a theoretical CQI scale 72, along which is indicated a first communication-quality threshold 74 and a second communication-quality threshold 76. Second communication-quality threshold 76, as shown, is greater than first communication-quality threshold 74.

Also indicated in FIG. 5 is first call setup procedure 78, second call setup procedure 80, and third call setup procedure 82. In accordance with the functions described above with respect to FIG. 4, the various call setup-procedures indicated in FIG. 5 may, in general, be selected by the network node depending on whether the received indication of the communication quality of the at least one channel exceeds, and/or does not exceed, first communication-quality threshold 74 and/or second communication-quality threshold 76.

For instance, the network node may compare the received indication of the communication quality of the at least one channel to first communication-quality threshold 74. If, the network node determines that the received indication of the communication quality does not exceed first communication-quality threshold 74, then the network node may select first call setup procedure 78.

First call setup procedure 78 may generally involve a "release and redirect" procedure whereby, because the communication quality of the at least channel is determined to be threshold low, the first RAN simply releases the WCD to then engage in call setup via the second RAN. In other words, the first RAN may not provide to the WCD information (such as carrier and/or traffic channel information) that the WCD uses to setup the call via the second RAN. First call setup procedure 78, therefore, may involve directing, via a base station of the second RAN, the given WCD to use for the call (a) a particular carrier provided by the second RAN according to the second air interface protocol and (b) a particular traffic channel provided by the second RAN according to the second air interface protocol.

If, in another circumstance, the network node determines that the received indication of the communication quality does exceed first communication-quality threshold 74, then the network node may select second call setup procedure 80. It may be desirable, in this circumstance, to provide at least the particular carrier information via the first RAN, because it was determined that the communication quality of the communication channel between the first RAN and the WCD exceeds at least the first communication-quality threshold.

Accordingly, second call setup procedure 80 may generally involve the first RAN communicating an "extended channel assignment message" (ECAM) to the WCD whereby the first RAN directs the WCD to scan particular carriers provided by a serving base station of the second RAN so that the WCD may ultimately acquire connectivity via one of those particular carriers. The WCD may then obtain other control information, such as a traffic-channel assignment, from the second RAN. Second call setup procedure 80, therefore, may involve, (a) directing, via a base station of the first RAN, the given WCD to use for the call a particular carrier provided by the second RAN according to the second air interface protocol and (b) directing, via a base station of the second RAN, the given WCD to use for the call a particular traffic channel provided by the second RAN according to the second air interface protocol. And, while an ECAM message may be used to direct the given WCD to use for the call the particular carrier provided by the second RAN, this is not necessary. Other, or additional, messages may be used as well.

If, in yet another circumstance, the network node determines that the received indication of the communication quality exceeds second communication-quality threshold 76, then the network node may select third call setup procedure 82. It may be desirable, in this circumstance, to provide both the particular carrier information and the particular traffic-channel information via the first RAN, because it was determined that the communication quality of the communication channel between the first RAN and the WCD exceeds the second communication-quality threshold (which is even greater than the first communication-quality threshold).

Accordingly, third call setup procedure 82 may generally involve the first RAN communicating a "universal handoff-direction message" (UHDM) to the WCD whereby the first RAN directs the WCD to obtain connectivity with the second RAN on a particular carrier and a particular traffic channel. Third call setup procedure 82, therefore, may involve directing, via a base station of the first RAN, the given WCD to use for the call (a) a particular carrier provided by the second RAN according to the second air interface protocol and (b) a particular traffic channel provided by the second RAN according to the second air interface protocol. And, while a UHDM message may be used to direct the given WCD to use for the call the particular carrier and particular traffic channel provided by the second RAN, this is not necessary. Other, or additional, messages may be used as well.

As noted above, although aspects of three particular call setup procedures are described herein, neither this number of call setup procedures, nor the particular call setup procedures need be used. Indeed, as also noted above, in an alternative implementation only two particular call setup procedures may be used, and the received indication of the communication quality of the at least one channel may be compared to just a first communication-quality threshold to help select between the two particular call setup procedures.

In such an implementation, the network node may select a first call setup procedure if the received indication of the communication quality does not exceed the first communication-quality threshold, and the network node may select a second call setup procedure if the received indication of the communication quality exceeds the first communication-quality threshold. In this implementation, the first call setup procedure may involve directing, via a base station of the second RAN, the given WCD to use for the call (a) a particular carrier provided by the second RAN according to the second air interface protocol and (b) a particular traffic channel provided by the second RAN according to the second air interface protocol. And the second call setup procedure may involve directing, via a base station of the first RAN, the given WCD to use for the call (a) a particular carrier provided by the second RAN according to the second air interface protocol and (b) a particular traffic channel provided by the second RAN according to the second air interface protocol.

Now, with reference to block 54, the network node signals to invoke setup of the call using the selected call setup procedure. Examples of the signaling that the network node may engage in will now be discussed with respect to the various call setup procedures discussed above with respect to FIG. 5. However, it should be understood that this is for purposes of explanation only, and that the network node may engage in additional and/or alternative signaling to invoke setup of the call using these respective call setup procedures. Further, as noted above, the network node may select a call setup procedure other than a particular call setup procedure described herein and, in such a case, the network node may engage in signaling different altogether from the example signaling described herein to setup the call.

Additionally, the example signaling is described below with reference to the example network shown in FIG. 2. For example, the network node that performs the signaling is described as IWS 24. However, this is not necessary. The signaling may be carried out in other network arrangements, and may be carried out by other network nodes.

As a first example, where IWS 24 previously selected first call setup procedure 78, which may involve eNodeB 30 ultimately transmitting a "release and redirect" message to the given WCD, IWS 24 may signal to cause eNodeB 30 to send that "release and redirect" message to the given WCD. More particularly, IWS 24 may send a message to MME 32, which MME 32 may then relay to eNodeB 30, and that message may direct eNodeB 30 to send the "release and redirect" message.

As a second example, where IWS 24 previously selected second call setup procedure 80, which may involve eNodeB 30 ultimately transmitting an ECAM message to the given WCD, IWS 24 may initially signal to a network node within the second RAN, for instance MSC 42, to request carrier information that the WCD should use under the second air interface protocol for the call. MSC 42 may then return such carrier information to IWS 24. IWS 24 may then signal to cause eNodeB 30 to send an ECAM message to the given WCD that contains the carrier information provided by the second RAN. More particularly, IWS 24 may send a message to MME 32, which MME 32 may then relay to eNodeB 30, and that message may direct eNodeB 30 to send the ECAM message.

As a third example, where IWS 24 previously selected third call setup procedure 82, which may involve eNodeB 30 ultimately transmitting a UHDM message to the given WCD, IWS 24 may initially signal to a network node within the second RAN, for instance MSC 42, to request carrier and traffic channel information that the WCD should use under the second air interface protocol for the call. MSC 42 may then return such carrier information to IWS 24. IWS 24 may then signal to cause eNodeB 30 to send a UHDM message to the given WCD that contains the carrier information provided by the second RAN. More particularly, IWS 24 may send a message to MME 32, which MME 32 may then relay to eNodeB 30, and that message may direct eNodeB 30 to send the UHDM message.

Figure 6:
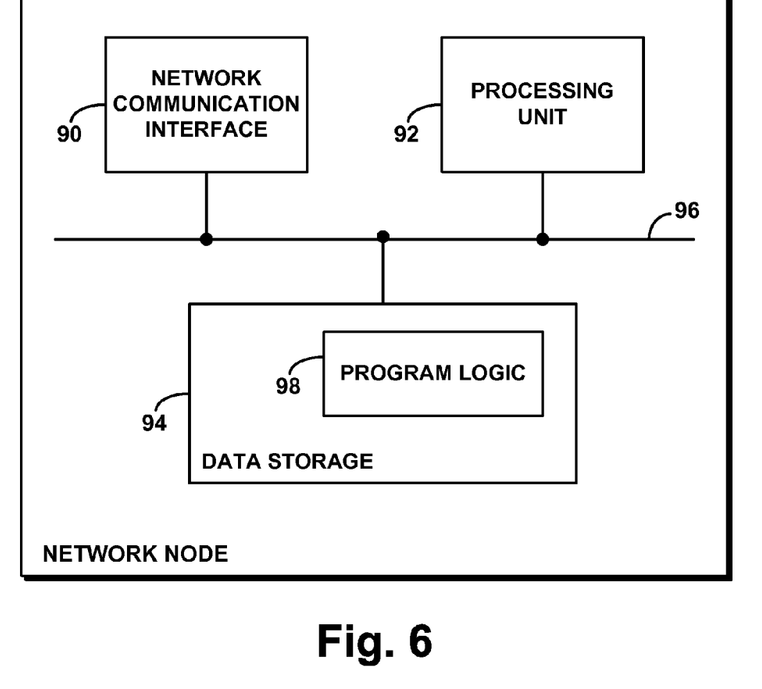
FIG. 6 is a simplified block diagram of a network node arranged to carry out various functions in accordance with an example method.

FIG. 6 is a simplified block diagram of a network node, such as IWS 24 or another entity, that may be configured to carry out the example method described above. As shown, the example network node includes a network communication interface 90, a processing unit 92, and non-transitory data storage 94, all of which may be coupled together by a system bus, network, or other connection mechanism 96.

Network communication interface 90 functions to facilitate communication with other entities, such as MME 32 and/or MSC 42, among other examples. As such, the network communication interface may comprise multiple network interface modules, such as Ethernet modules for instance, or may take any of a variety of other forms, supporting wireless and/or wired network communication.

Processing unit 92 may include one or more general purpose processors (such as microprocessors) and/or one or more special purpose processors (e.g., application specific integrated circuits). And data storage 94 may comprise one or more volatile and/or non-volatile storage components, such as optical, magnetic, or flash storage, and may be integrated in whole or in part with processing unit 92.

As shown, data storage 94 may hold program logic 98 (or program instructions) that are executable or interpretable by processing unit 92 to carry out various functions described herein. For instance, the program instructions may cause the processing unit, and thus the network node to, (i) while a given WCD is being served by the first RAN using at least one channel, receive at the network node an indication of a communication quality of the at least one channel used by the first RAN to serve the given WCD, (ii) select a call setup procedure for establishing a call to be served by the second RAN based on the received indication of the communication quality of the at least one channel, wherein the selected call setup procedure comprises the given UE transitioning to be served with the call by the second RAN, and (iii) signal to invoke setup of the call using the selected call setup procedure.

Example embodiments have been described above. It should be understood, however, that variations from these embodiments are possible, while remaining within the true spirit and scope of the invention.

We claim:

1. In a communication system comprising a first radio access network (RAN) configured to serve wireless communication devices (WCDs) according to a first air interface protocol, a second RAN configured to serve WCDs according to a second air interface protocol, and a network node communicatively coupled to the first RAN and the second RAN, a method comprising:

while a given WCD is being served by the first RAN using at least one channel, receiving at the network node an indication of a communication quality of the at least one channel used by the first RAN to serve the given WCD;

selecting by the network node a call setup procedure for establishing a call to be served by the second RAN, wherein the selecting is based on the received indication of the communication quality of the at least one channel, and wherein the selected call setup procedure comprises the given WCD transitioning to be served with the call by the second RAN; and signaling by the network node to invoke setup of the call using the selected call setup procedure.

2. The method of claim 1, wherein the received indication of the communication quality of the at least one channel is received from the given WCD via the first RAN.

3. The method of claim 1, wherein the received indication of the communication quality of the at least one channel comprises a channel quality indicator (CQI).

4. The method of claim 1, wherein selecting the call setup procedure based on the received indication of the communication quality of the at least one channel comprises:

comparing the received indication of the communication quality of the at least one channel to a first communication-quality threshold;

selecting a first call setup procedure in response to a determination that the received indication of the communication quality of the at least one channel does not exceed the first communication-quality threshold; and selecting a second call setup procedure in response to a determination that the received indication of the communication quality of the at least one channel exceeds the first communication-quality threshold.

5. The method of claim 4, wherein the first call setup procedure comprises directing, via a base station of the second RAN, the given WCD to use for the call (a) a particular carrier provided by the second RAN according to the second air interface protocol and (b) a particular traffic channel provided by the second RAN according to the second air interface protocol, and wherein the second call setup procedure comprises directing, via a base station of the first RAN, the given WCD to use for the call (a) a particular carrier provided by the second RAN according to the second air interface protocol and (b) a particular traffic channel provided by the second RAN according to the second air interface protocol.

6. The method of claim 4, wherein selecting the call setup procedure based on the received indication of the quality of the at least one channel further comprises:

comparing the received indication of the communication quality of the at least one channel to a second communication-quality threshold, wherein the second communication-quality threshold is greater than the first communication-quality threshold; and selecting a third call setup procedure in response to a determination that the indication of the communication quality exceeds the second communication-quality threshold.

7. The method of claim 6, wherein the first call setup procedure comprises directing, via a base station of the second RAN, the given WCD to use for the call (a) a particular carrier provided by the second RAN according to the second air interface protocol and (b) a particular traffic channel provided by the second RAN according to the second air interface protocol, wherein the second call setup procedure comprises (a) directing, via a base station of the first RAN, the given WCD to use for the call a particular carrier provided by the second RAN according to the second air interface protocol and (b) directing, via a base station of the second RAN, the given WCD to use for the call a particular traffic channel provided by the second RAN according to the second air interface protocol, and wherein the third call setup procedure comprises directing, via a base station of the first RAN, the given WCD to use for the call (a) a particular carrier provided by the second RAN according to the second air interface protocol and (b) a particular traffic channel provided by the second RAN according to the second air interface protocol.

8. The method of claim 1, wherein the call is originated from a remote location.

9. The method of claim 8, wherein receiving the indication of the communication quality of the at least one channel comprises receiving a circuit-switched-fallback (CSFB) page-response message sent by the given WCD that includes the indication of the communication quality of the at least one channel.

10. The method of claim 1, wherein the call is originated from the given WCD.

11. The method of claim 10, wherein receiving the indication of the communication quality of the at least one channel comprises receiving a circuit-switched-fallback (CSFB) origination message sent by the given WCD that includes the indication of the communication quality of the at least one channel.

12. The method of claim 1, wherein the call is a circuit-switched-fallback (CSFB) call.

13. The method of claim 1, wherein the first air interface protocol is Long Term Evolution (LTE) and the second air interface protocol comprises an air interface protocol selected from the group consisting of Code Division Multiple Access (CDMA) and Global System for Mobile Communication (GSM).

14. A network node comprising:

at least one network communication interface communicatively coupled to a first radio access network (RAN) and a second RAN, wherein the first RAN is configured to serve wireless communication devices (WCDs) according to a first air interface protocol, and wherein the second RAN is configured to serve WCDs according to a second air interface protocol;

a processor; and non-transitory data storage comprising program instructions executable by the processor for causing the network node to carry out functions including:

while a given WCD is being served by the first RAN using at least one channel, receiving at the network node an indication of a communication quality of the at least one channel used by the first RAN to serve the given WCD;

selecting by the network node a call setup procedure for establishing a call to be served by the second RAN, wherein the selecting is based on the received indication of the communication quality of the at least one channel, and wherein the selected call setup procedure comprises the given WCD transitioning to be served with the call by the second RAN; and signaling by the network node to invoke setup of the call using the selected call setup procedure.

15. The network node of claim 14, wherein selecting the call setup procedure based on the received indication of the communication quality of the at least one channel comprises:

comparing the received indication of the communication quality of the at least one channel to a first communication-quality threshold;

selecting a first call setup procedure in response to a determination that the received indication of the communication quality of the at least one channel does not exceed the first communication-quality threshold; and selecting a second call setup procedure in response to a determination that the received indication of the communication quality of the at least one channel exceeds the first communication-quality threshold.

16. The network node of claim 15, wherein the first call setup procedure comprises directing, via a base station of the second RAN, the given WCD to use for the call (a) a particular carrier provided by the second RAN according to the second air interface protocol and (b) a particular traffic channel provided by the second RAN according to the second air interface protocol, and wherein the second call setup procedure comprises directing, via a base station of the first RAN, the given WCD to use for the call (a) a particular carrier provided by the second RAN according to the second air interface protocol and (b) a particular traffic channel provided by the second RAN according to the second air interface protocol.

17. The network node of claim 15, wherein selecting the call setup procedure based on the received indication of the quality of the at least one channel further comprises:

comparing the received indication of the communication quality of the at least one channel to a second communication-quality threshold, wherein the second communication-quality threshold is greater than the first communication-quality threshold; and selecting a third call setup procedure in response to a determination that the indication of the communication quality exceeds the second communication-quality threshold.

18. The network node of claim 17, wherein the first call setup procedure comprises directing, via a base station of the second RAN, the given WCD to use for the call (a) a particular carrier provided by the second RAN according to the second air interface protocol and (b) a particular traffic channel provided by the second RAN according to the second air interface protocol, wherein the second call setup procedure comprises (a) directing, via a base station of the first RAN, the given WCD to use for the call a particular carrier provided by the second RAN according to the second air interface protocol and (b) directing, via a base station of the second RAN, the given WCD to use for the call a particular traffic channel provided by the second RAN according to the second air interface protocol, and wherein the third call setup procedure comprises directing, via a base station of the first RAN, the given WCD to use for the call (a) a particular carrier provided by the second RAN according to the second air interface protocol and (b) a particular traffic channel provided by the second RAN according to the second air interface protocol.

19. The network node of claim 14, wherein the call is originated from a remote location, and wherein receiving the indication of the communication quality of the at least one channel comprises receiving a circuit-switched-fallback (CSFB) page-response message sent by the given WCD that includes the indication of the communication quality of the at least one channel.

20. The network node of claim 14, wherein the call is originated from the given WCD, and wherein receiving the indication of the communication quality of the at least one channel comprises receiving a circuit-switched-fallback (CSFB) origination message sent by the given WCD that includes the indication of the communication quality of the at least one channel.

* * * * *